United States Patent [19]

Fischer et al.

[11] 4,119,759

[45] Oct. 10, 1978

[54] POWDERED RUBBER

[75] Inventors: Erhardt Fischer; Michael Hugh Richmond, both of Sarnia, Canada

[73] Assignee: Polysar Limited, Sarnia, Canada

[21] Appl. No.: 832,474

[22] Filed: Sep. 12, 1977

[30] Foreign Application Priority Data

Oct. 7, 1976 [CA] Canada .................................. 262927

[51] Int. Cl.$^2$ .............................................. B05D 7/00
[52] U.S. Cl. ..................................... 428/407; 427/222
[58] Field of Search ...................... 427/222; 260/894; 428/407

[56] References Cited

U.S. PATENT DOCUMENTS

| 3,494,784 | 2/1970 | Coene | 427/222 |
| 3,813,259 | 5/1974 | Neubert | 427/222 |
| 3,956,218 | 3/1976 | Keppler | 260/894 |

*Primary Examiner*—Ronald H. Smith
*Assistant Examiner*—Sam Silverberg
*Attorney, Agent, or Firm*—Stevens, Davis, Miller & Mosher

[57] ABSTRACT

Conjugated diolefin-vinyl nitrile compound rubbers are produced in powder form by treatment of the coagulated rubber with a conjugated diolefin-vinyl nitrile compound vinyl aromatic hydrocarbon polymer. Such powdered rubbers may be used wherever conjugated diolefin-vinyl nitrile compound rubbers are used.

12 Claims, No Drawings

POWDERED RUBBER

This invention is directed to a process for the production of free flowing rubber particles, particularly free flowing butadiene-acrylonitrile rubber particles.

Rubber has conventionally been available, in the solid state, in the form of bales or relatively large size particles and the rubber consuming industry is largely geared to the use of rubber in this form by virtue of the availability of high powered, high shear mixing equipment. On the other hand, many plastics are available as small size particles or powders and the plastics industry is largely geared to the use of such product forms by the availability of low shear mixing equipment and the capability of causing the final intimate mixing to occur immediately prior to the forming step.

More recently, rubbers have been made available as powders or free flowing small particles and some of the producers of the final end products are gearing up to use such product forms. Whether or not the use of powdered or particulate rubbers will require a lower level of energy consumption in the mixing process is still a subject of much debate. In spite of this debate, a growing market need is being established for rubbers in the form of powders or free flowing small particles.

One of the earliest methods of producing powdered rubbers was to start with rubber in bale form and to mechanically grind this to yield a powdered product. The art in this field has been developed to the stage where such powdered rubbers can be produced in a reasonable manner but to prevent subsequent reagglomeration of the powdered rubber it has to be coated with an anti-agglomerating or partitioning agent, such as a metallic silicate. The product, therefore, is not a pure rubber but contains up to about ten percent of material to prevent reagglomeration, which material is not necessarily of use to the rubber compounder.

In an attempt to eliminate the need to recover and dry the rubber and then grind it, methods have been developed for starting with the rubber in latex form and coagulating the latex particles under special conditions and in the presence of a variety of additives to yield the rubber in powder or particulate form, which is then dried. Examples of such additives include various forms of silica, various silicates and modified forms of starch. The products of such processes all contain up to about ten percent of such additives which are not of a similar nature to the polymer and which may not be of use to the rubber compounder, serving only to prevent agglommeration of the particles.

One portion of the art is directed to encapsulation of rubber particles with polymeric resins. In a particular section of this art, a dilute resin latex and a dilute coagulating agent are together added to particles of the rubber at a temperature near to or above the agglomeration temperature of the resin. This causes adhesion of the resin to the rubber particles and the product is said to be non-agglomerating on standing or storage. Suitable such resins include styrene-butadiene polymers containing 80 to 99 weight percent of styrene, polyvinyl chloride and polystyrene.

We have now discovered an improved process for the production of particulate rubbers wherein, in the preferred mode, to particles of a butadiene-acrylonitrile rubber which already contains a minor proportion of a butadiene-acrylonitrile-styrene terpolymer (as hereinafter defined) is added a butadiene-acrylonitrile-styrene terpolymer to encapsulate said particles, the so formed rubber particles being free flowing, of substantially uniform size and essentially non-agglomerating while having physical characteristics, when vulcanized, essentially unchanged from those of the original rubber.

It is an objective of this invention to provide a process for the production of free flowing rubber particles which comprises the coagulation of a latex of a rubber in the presence of a minor proportion of a terpolymer, said minor proportion being from about 1 to about 5 parts by weight of dry terpolymer per 100 parts by weight of dry rubber, heating the coagulated mixture so produced to about 190° to about 210° F. while being maintained under mild agitation, and adding to said heated coagulated mixture to encapsulate the rubber particles therein a latex of said terpolymer in an amount of from about 5 to about 15 parts by weight of dry terpolymer per 100 parts by weight of dry rubber, separating the encapsulated rubber particles from the aqueous phase and drying the separated encapsulated rubber particles to yield free flowing rubber particles, said rubber being a copolymer of about 50 to about 80 weight percent of a $C_4$-$C_6$ conjugated diolefin and about 20 to about 50 weight percent of a $C_3$-$C_5$ vinyl compound containing a nitrile group, said coagulation being in the presence of from 0.1 to 1.0 weight percent of an inorganic salt in water at a temperature of from about 140° to about 180° F. while being subjected to high speed, high shear agitation, characterized in that said terpolymer contains from about 40 to about 60 weight percent of a $C_4$-$C_6$ conjugated diolefin, from about 10 to about 20 weight percent of a $C_3$-$C_5$ vinyl compound containing a nitrile group and from about 30 to about 40 weight percent of a $C_8$-$C_{10}$ vinyl- or vinylidene-substituted aromatic hydrocarbon and that said terpolymer has rubbery and resinous phases.

We have found that the use of the terpolymer as the encapsulating material leads to the production of good quality free flowing rubber particles which substantially do not agglomerate during storage or on standing, of which the particle size is uniform and may be within the range of about 0.5 to 5mm in length and which, on vulcanization, show substantially no change in the strength characteristics of the vulcanizate when compared with the non-encapsulated rubber. We have further found that the rubber particles may be dusted with from 1 to 5, preferably 2 to 3, parts by weight per 100 parts by weight of dry particles of precipitated silica having an average particle size of from 0.01 to 0.05 microns, as a dusting agent, which improves even more the storage time during which the free flowing character is retained. We have also found that the encapsulating terpolymer, presumably because of the similarity of the terpolymer to the rubber, adheres well to the rubber and does not form fine dusty terpolymer particles which may separate from the rubber.

The copolymer of a $C_4$-$C_6$ conjugated diolefin and a $C_3$-$C_5$ vinyl compound containing a nitrile group, a class of rubber well known in the art, is produced as a latex by conventional free radical emulsion polymerization techniques. The $C_4$-$C_6$ conjugated diolefin is suitably butadiene, isoprene or piperylene, with butadiene-1,3 being the preferred monomer. The $C_3$-$C_5$ vinyl compound containing a nitrile group is suitably acrylonitrile, methacrylonitrile or ethacrylonitrile, with acrylonitrile being the preferred monomer. The proportions of such monomers in the rubber are from about 50 to about 80 weight percent of conjugated diolefin and from about 20 to about 50 weight percent of nitrile group compound; preferably the rubber contains from about 50 to about 75 weight percent of butadiene and from about 25 to about 50 weight percent of acrylonitrile. The rubber may also contain small amounts, up to about 1 weight percent, of a difunctional crosslinkable monomer, such as divinylbenzene, replacing an equivalent weight of butadiene. The monomer mixture is emulsified in water, suitable emulsifiers including the alkali salts of sulphonated alkyl aryl carboxylic acids, and the emulsion is added to the reactor together with electrolytes, modifiers, catalyst and activator. The residual monomers, on completion of the polymerization, are removed by degassing, vacuum distillation or similar conventional means, a stabilizer or antioxidant is added and the latex is suitable for use in the process of this invention. The rubber solids content of the latex is suitably from about 10 to about 30 percent, preferably from 15 to 25 percent.

The terpolymer of a $C_4$-$C_6$ conjugated diolefin, a $C_3$-$C_5$ vinyl compound containing a nitrile group and a $C_8$-$C_{10}$ vinyl- or vinylidene-substituted aromatic hydrocarbon is produced by a free radical emulsion polymerization. Suitable $C_4$-$C_6$ conjugated diolefins include butadiene, isoprene and piperylene, with butadiene-1,3 being preferred. Suitable $C_3$-$C_5$ vinyl compounds containing a nitrile group include acrylonitrile, methacrylonitrile and ethacrylonitrile, with acrylonitrile being preferred. Suitable $C_8$-$C_{10}$ vinyl- or vinylidene-substituted aromatic hydrocarbons include styrene, vinyl toluene, alphamethyl styrene and vinyl ethyl benzene, with styrene being the preferred monomer. The overall proportions of such monomers in the polymer are from about 40 to about 60 weight percent of conjugated diolefin, preferably 50 to 60 weight percent of butadiene, from about 10 to about 20 weight percent of the nitrile group containing compound, preferably from 10 to 15 weight percent of acrylonitrile, and from about 30 to about 40 weight percent of the substituted aromatic hydrocarbon, preferably from 30 to 35 weight percent of styrene. A suitable polymer may be prepared by mixing butadiene and acrylonitrile in proportions of 75 to 100 parts by weight of butadiene with 0 to 25 parts by weight of acrylonitrile, emulsifying this mixture in water using an ionic micelle forming emulsifier, such as the alkali metal or ammonium salts of saturated or unsaturated carboxylic acids, or of rosin acids or disproportionated rosin acids, or of alkyl sulphates or sulphonates. This emulsion is fed to a reactor together with a free radical catalyst and activator and suitable modifiers. The polymerization is at a temperature of about 120° to about 160° F. (50° to 70° C.) and is continued to a conversion of at least 80 percent, preferably at least 90 percent of the monomers. The so formed latex is subjected to an agglomeration process to increase the particle size of the latex to about 1500 to about 2500 Angstrom units. Such agglomeration processes are well known in the art and include mechanical methods using a homogenizing device, chemical methods involving the addition of agglomerating agents such as polyvinyl ether, Carbowax or ionic salts, and physical methods using freeze agglomeration involving freezing and thawing of the latex. Optionally, a minor proportion of polystyrene latex may be added. The temperature of the agglomerated latex is raised to about 175° to about 194° F. (80° to 90° C.) and an emulsion in water is added of a mixture in the proportions of about 65 to about 80 parts by weight of styrene and about 20 to about 35 parts by weight of acrylonitrile, the amount of styrene and acrylonitrile mixture being from 35 to 60 parts by weight per 65 to 40 parts by weight of butadiene-acrylonitrile polymer. The additional monomers are polymerized to at least 80 percent, preferably at least 90 percent, conversion to yield the final polymer which is recovered by conventional methods as a stable latex. The terpolymer is found to have rubbery phases and resinous phases, with the overall characteristics being of a rubber not a plastic.

The process of this invention may be practised as a batch process or a continuous process. In the batch process, a butadiene-acrylonitrile rubber latex and a butadiene-styrene-acrylonitrile terpolymer latex are slowly added to a strongly agitated coagulation mixture and are co-coagulated therein. Suitable amounts of the butadiene-styrene-acrylonitrile terpolymer are from about 1 to about 5 parts by weight, preferably 2 to 3 parts by weight, per 100 parts by weight of butadiene-acrylonitrile rubber based on dry weights. The butadiene-styrene-acrylonitrile terpolymer appears to act as a seed for the coagulation of the butadiene-acrylonitrile rubber. Suitable coagulation mixtures contain from 0.1 to 0.5 weight percent, preferably from 0.2 to 0.4 weight percent, of an inorganic salt in water, suitable inorganic salts being those well known in the art and including sodium chloride, calcium chloride, magnesium chloride, magnesium sulphate or aluminum sulphate, the preferred salt being calcium chloride. Suitable coagulation temperatures are from about 140° to about 180° F. (60°–82° C.). The agitation during the coagulation is high speed and high shear. On completion of the coagulation, the coagulated mixture is then heated to a temperature of about 195° to about 210° F. (90°–99° C.) while being maintained under mild agitation. Further butadiene-styrene-acrylonitrile terpolymer, in latex form, is added to the heated coagulated mixture. This portion of the butadiene-styrene-acrylonitrile terpolymer latex is diluted to a solids level of about 1 to about 7 weight percent, preferably from about 2 to about 5 weight percent, and the amount added to the coagulation mixture is from about 5 to about 15, preferably from 5 to 10, parts by weight of terpolymer per 100 parts by weight of butadiene-acrylonitrile rubber in the coagulated mixture. The residual coagulant remaining in the coagulated mixture is sufficient to cause coagulation of the butadiene-styrene-acrylonitrile terpolymer which appears to encapsulate the particles of the butadiene-acrylonitrile rubber in the coagulated mixture. The coated or encapsulated rubber particles so formed are separated from the aqueous phase by conventional means and then dried to yield free flowing rubber particles. The rubber particles so recovered contain from about 6 to about 20, preferably from about 7 to about 13, parts by weight of butadiene-styrene-acrylonitrile terpolymer per 100 parts by weight of butadiene-acrylonitrile rubber.

When practising this invention in a continuous process, the aqueous phase separated from the encapsulated rubber particles as in the batch process is recycled to the coagulation stage and reused as the coagulation mixture. As is well known in the art, increments of fresh coagulation mixture may be added to the recycled product. We have also found that the recycled coagulation mixture usually contains a sufficient amount of fine particles of the terpolymer such that the addition of the terpolymer latex to the coagulation mixture may be cut back or even discontinued as the amount of recycle coagulation mixture increases. In other respects, the continuous process is similar to the batch process.

The rubber particles from either the batch or continuous process may be dusted with fine particle silica if it is necessary or desirable to further improve the retention of the free flowing characteristics after prolonged storage.

The rubber particles of this invention may be used in any application where conjugated diolefin - vinyl nitrile compound rubbers are used and are particularly of advantage for mixing with polyvinyl chloride in powder form.

The invention is exemplified by the following examples, wherein all parts are parts by weight unless otherwise specified.

EXAMPLE 1

There was used a butadiene-acrylonitrile rubber latex, containing 19.5 weight percent solids, in which the rubber contained about 34 weight percent of acrylonitrile and had a Mooney (ML-4 at 100° C.) of about 50. A butadiene-styrene-acrylonitrile terpolymer latex was used, which terpolymer contained about 55 weight percent of butadiene, about 33 weight percent of styrene and about 12 weight percent of acrylonitrile and which had a Mooney (ML-4 at 121° C.) of 79. The solids content was about 42 weight percent. 3g of the terpolymer latex were diluted with 120ml of water and were added simultaneously with 254g of the rubber latex to a coagulating mixture of 6g of calcium chloride in two liters of water which was maintained at 160° F. [71° C.] and was subjected to high speed agitation by means of an air driven stirrer. The co-coagulation yielded small particles of rubber. The coagulated mixture was then heated to 200° F. [93° C.] while being maintained under mild agitation following which 9g of the terpolymer latex, diluted with 120ml of water, was slowly added to encapsulate the rubber particles. On completion of the addition, the mixture was agitated for a further 2 to 3 minutes after which the rubber particles were separated from the aqueous phase by screening and the recovered rubber particles were dried in an air drier at a temperature of 60° C. for 2 hours. The aqueous phase was found to be clear, indicating no fines, and the rubber particles were found to be uniform in size, being about 0.5mm in length, and to be non-tacky and non-agglomerating.

EXAMPLE 2

For comparison purposes, a rubbery random copolymer in latex form of butadiene-styrene-acrylonitrile containing 55 weight percent of butadiene and 32.5 weight percent of styrene and prepared by a single stage poolymerization was used in place of the butadiene-styrene-acrylonitrile terpolymer of Example 1. All other conditions and proportions were the same as in Example 1. The rubber particles were separated from the aqueous phase by screening and were found to form a cake on the screen; the cake could not be readily broken up. This comparison example shows that the butadiene-styrene-acrylonitrile terpolymer of Example 1 is necessary for the formation of non-tacky, non-agglomerating rubber particles.

EXAMPLE 3

For comparison purposes, the procedure of Example 1 was followed, using the same materials, in all respects except that the butadiene-acrylonitrile rubber latex was coagulated in the absence of any initially added butadiene-styrene-acrylonitrile terpolymer. The subsequent encapsulation was as described in Example 1. The recovered rubber particles, which were substantially non-tacky and non-agglomerating, were found to be non-uniform in size, being generally of about 1 to 2mm in length but with some agglomerates of 2 to 5mm in size. This comparison example shows that the presence of the butadiene-styrene-acrylonitrile terpolymer during the initial coagulation stage facilitates the formation of uniform sized small particles during that stage.

EXAMPLE 4

A sample of a butadiene-acrylonitrile rubber latex (31.3 weight percent solids) of Example 1 was co-coagulated and then encapsulated with a high styrene resin latex. The high styrene resin contained about 90 weight percent of styrene and about 10 weight percent of butadiene and the latex contained 35.8 percent solids. 160g of the butadiene-acrylonitrile rubber latex and 3.5g of the high styrene resin latex were slowly added to a well agitated solution of 6g of calcium chloride in 2 liters of water maintained at a temperature of 160° F. [71° C.]. The coagulation mixture was maintained under mild agitation and was heated to 200° F. [93° C. ]. To this heated coagulated mixture was then added a further 7g of the high styrene resin latex. The encapsulated rubber particles were separated from the aqueous phase and dried. The final product was a non-tacky powder of very small particle size (less than 0.5mm).

This Example shows that the prior art leads to the production of uniform sized particles but that the particle size is too small. When this rubber was compounded on a rubber mill, difficulty was experienced in incorporation of the carbon black.

EXAMPLE 5

The procedure described in Example 1 was followed except that a butadiene-acrylonitrile-divinyl benzene rubber latex containing about 34 weight percent of acrylonitrile and about 65 weight percent of butadiene and having a Mooney (ML-4 at 100° C.) of 72 was used instead of the butadiene-acrylonitrile rubber. This latex contained 31.7 percent solids and 160g was co-coagulated with 3g, diluted with 120ml of water, of the butadiene-styrene-acrylonitrile terpolymer latex at 160° F. On completion of the coagulation, the agitation was reduced to a mild state, the mixture heated to 200° F. (93° C.) and 9g of the terpolymer latex, diluted with 120ml of water, was slowly added to encapsulate the rubber particles. On recovery the rubber particles were uniformly about 1mm in length and non-tacky.

EXAMPLE 6

For a continuous process, a coagulation tank having a capacity of 30 gallons and equipped with a supply of steam, a temperature controller and a high speed agitator, was connected to an encapsulation tank which had a capacity of 30 gallons, had a source of steam, a temperature controller and an agitator. A system was used for the supply of an aqueous calcium chloride solution to be coagulation tank and for collection and recycling or recovered calcium chloride solution. A butadiene-acrylonitrile latex (the rubber contained 34 weight percent of bound acrylonitrile) containing 23 weight percent solids was pumped into the coagulation tank at a rate of 0.25 gallons/minute. Calcium chloride solution was pumped into the tank, which already contained about 20 gallons of solution, at about 5 gallons/minute to maintain a concentration of from 0.3 to 0.6 weight percent calcium chloride in the aqueous phase. A butadiene-acrylonitrile-styrene terpolymer latex diluted to 2.1 weight percent solids (the terpolymer latex of Example 1) was pumped into the coagulation tank at a rate of 0.06 gallons/minute. The temperature in the coagulation tank was maintained at 180° F. The coagulated product from the coagulation tank was fed to the encapsulation tank at a rate of about 5.3 gallons/minute. Steam was added to the encapsulation tank to maintain the temperature of the approximately 20 gallons of aqueous phase therein at 200° F. To the encapsulation tank was also added a further stream of the butadiene-acrylonitrile-styrene terpolymer latex at a rate of 0.18–0.2 gallons/minute. The encapsulated product was removed from the tank at a rate of about 5.5 gallons/minute, passed over a shaker screen to separate the majority of the aqueous phase and the particulate rubber was fed to a wash tank containing water at a temperature of 70°–75° F. The washed particulate rubber was separated from the water and dried. The aqueous phase separated from the encapsulated product on the shaker screen was recycled to the calcium chloride system for reuse.

After the process had been operating for thirty minutes, the supply of terpolymer latex to the coagulation tank was gradually reduced to zero because sufficient fine particles of terpolymer were being supplied to the coagulation tank from carry over with the recycled calcium chloride solution. The process was operated for a further thirty minutes during which time the terpolymer in the coagulation tank was supplied by the recycled calcium chloride solution.

The particulate rubber obtained from the process was free flowing. On storage of the rubber particles, some agglomeration was found to occur. A portion of the particulate rubber was dusted with silica powder (HiSil 233, HiSil is a registered trademark), the amount of silica being two weight percent based on the particulate rubber. Comparison of the free flowing characteristics of the particulate rubber with the silica dusted particulate rubber on storage in bags under a pressure of 0.5 psi showed that the silica dusted rubber particles required little agitation to become free flowing after four weeks' storage whereas the non-dusted rubber particles required more mechanical effort to become free flowing, showing that the dusting with silica of the rubber particles improves even more the storage time during which the free flowing character is retained.

EXAMPLE 7

Vulcanizates were prepared from the rubber particles of Example 1 and the rubber particles of Example 4 and the properties were compared with the properties of a vulcanizate of butadiene-acrylonitrile rubber used in Example 1. There was essentially no differences between any of the vulcanizates.

What is claimed is:

1. A process for the production of free flowing rubber particles which comprises the coagulation of a latex of a rubber in the presence of a minor proportion of a terpolymer latex, said minor proportion being from about 1 to about 5 parts by weight of dry terpolymer per 100 parts by weight of dry rubber, heating the coagulated mixture so produced to about 190° to about 210° F. while being maintained under mild agitation, and adding to said heated coagulated mixture to encapsulate the rubber particles therein, a latex of said terpolymer in an amount of from about 5 to about 15 parts by weight of dry terpolymer per 100 parts by weight of dry rubber, separating the encapsulated rubber particles from the aqueous phase and drying the separated encapsulated rubber particles to yield free flowing rubber particles, said rubber being a copolymer of about 50 to about 80 weight percent of a $C_4$-$C_6$ conjugated diolefin and about 20 to about 50 weight percent of a $C_3$-$C_5$ vinyl compound containing a nitrile group, said coagulation being in the presence of from 0.1 to 1.0 weight percent of an inorganic salt in water at a temperature of from about 140° to about 180° F. while being subjected to high speed, high shear agitation, characterized in that said terpolymer contains from about 40 to about 60 weight percent of a $C_4$-$C_6$ conjugated diolefin, from about 10 to about 20 weight percent of a $C_3$-$C_5$ vinyl compound containing a nitrile group and from about 30 to about 40 weight percent of a $C_8$-$C_{10}$ vinyl-or vinylidene-substituted aromatic hydrocarbon and that said terpolymer has rubbery and resinous phases.

2. The process of claim 1 wherein the dry particles are dusted with from 1 to 5 parts by weight per 100 parts by weight of dry particles of precipitated silica having an average particle size of from 0.01 to 0.05 microns.

3. The process of claim 1 which is a batch process wherein the minor proportion of said terpolymer is added as a latex and the latex of said terpolymer added for encapsulation is diluted to a solids content of about 1 to about 7 weight percent prior to addition to the coagulated mixture.

4. The process of claim 3 wherein the minor proportion of said terpolymer forms from 2 to 3 parts by weight of dry terpolymer per 100 parts by weight of dry rubber, the terpolymer latex added for encapsulation is diluted to a solids content of about 2 to about 5 weight percent prior to addition to the coagulated mixture and is added to the coagulated mixture in an amount of from 5 to 10 parts by weight of dry terpolymer per 100 parts by weight of dry rubber.

5. The process of claim 4 wherein the rubber is a butadiene-acrylonitrile rubber and the terpolymer is a butadiene-acrylonitrile-styrene terpolymer.

6. The process of claim 2 which is a batch process wherein the minor proportion of said terpolymer is added as a latex, the latex of said terpolymer added for encapsulation is diluted to a solids content of about 1 to about 7 weight percent prior to addition to the coagulated mixture, the rubber is a butadiene-acrylonitrile rubber and the terpolymer is a butadiene-acrylonitrile-styrene terpolymer.

7. The process of claim 1 which is a continuous process wherein the aqueous phase separated from the encapsulated rubber particles is recycled to the coagulation stage.

8. The process of claim 7 wherein the dry particles are coated with from 1 to 5 parts by weight per 100 parts by weight of dry particles of precipitated silica having an average particle size of from 0.01 to 0.05 microns.

9. The process of claim 7 wherein the latex of said terpolymer added for encapsulation is diluted to a solids content of about 1 to about 7 weight percent prior to addition to the coagulated mixture, said rubber is a butadiene-acrylonitrile rubber and said terpolymer is a butadiene-acrylonitrile-styrene terpolymer.

10. The process of claim 8 wherein the latex of said terpolymer added for encapsulation is diluted to a solids content of about 1 to about 7 weight percent prior to addition to the coagulated mixture, said rubber is a butadiene-acrylonitrile rubber and said terpolymer is a butadiene-acrylonitrile-styrene terpolymer.

11. Free flowing rubber particles as produced by the process of claim 1.

12. Free flowing rubber particles as produced by the process of claim 2.

* * * * *